United States Patent

Matsumoto et al.

[11] Patent Number: 6,116,384
[45] Date of Patent: Sep. 12, 2000

[54] DISK BRAKE

[75] Inventors: Atsuo Matsumoto; Yoshiki Matsuzaki, both of Itami, Japan

[73] Assignee: Sumitomo Electric Industries, Ltd., Osaka, Japan

[21] Appl. No.: 08/997,554

[22] Filed: Dec. 23, 1997

[51] Int. Cl.[7] .................................................. F16D 55/00
[52] U.S. Cl. ................................ 188/73.31; 188/73.35; 188/73.38; 188/250 D; 188/250 E
[58] Field of Search .............................. 188/73.31, 73.32, 188/73.35, 73.36, 73.37, 73.38, 73.44, 73.45, 250 E, 250 B, 250 D; 192/30 V

[56] References Cited

U.S. PATENT DOCUMENTS

| | | | |
|---|---|---|---|
| 4,155,430 | 5/1979 | Kawamura | 188/73.5 |
| 4,241,812 | 12/1980 | Burgdorf et al. | 188/250 B X |
| 4,809,825 | 3/1989 | Oltmanns, Jr. et al. | 188/73.31 |
| 5,289,903 | 3/1994 | Nagai et al. | 188/250 E X |
| 5,320,200 | 6/1994 | Hashimoto | 188/250 E |
| 5,706,917 | 1/1998 | Matsuzaki | 188/73.38 |

FOREIGN PATENT DOCUMENTS 9-53668  2/1997  Japan .

*Primary Examiner*—Robert J. Oberleitner
*Assistant Examiner*—Pamela J. Lipka
*Attorney, Agent, or Firm*—Greenblum & Bernstein, P.L.C.

[57] ABSTRACT

A disk brake having elements which enable the friction pads to retract together with the pistons when the braking fluid pressure is released, and which can also suppress brake squeaks. In order to retract the friction pads together with the pistons, first and second shims are disposed between the pad and the pistons on each side of the disk. The first shim, provided near the pad, has first claws gripping the back plate of the pad. The second shim, provided near the pistons, has third claws resiliently engaging the pistons. The first or second shims have second claws resiliently gripping the other shims so that the first and second shims can slide relative to each other in the radial direction of the disk.

5 Claims, 8 Drawing Sheets

DISK BRAKE

BACKGROUND OF THE INVENTION

The present invention relates to an open-topped disk brake having means for retracting the pads together with the piston to prevent the pads from dragging the disk when the fluid pressure is released.

An open-topped disk brake has a caliper having a window across which pad pins extend. The pad pins are inserted loosely through pin holes formed in back plates of the friction pads to axially slidably hang the pads. Since tangential torque is borne by the caliper, no torque is applied to the pad pins. By removing the pad pins, the friction pads can be pulled out through the window without the need to dismount the caliper from the vehicle knuckle. Worn pads can thus be replaced easily.

Ordinary disk brakes have pistons slidably received in fluid pressure cylinders formed in the caliper. To brake the disk, the pads are pressed against the disk. In a disk brake with opposed pistons, fluid pressure is applied to the opposed pistons to press both pads against the disk with the respective pistons. In a floating type disk brake, fluid pressure is applied to a piston or pistons on one side to press one of the pads with the pistons and press the other pad with a known reaction mechanism against the disk. When the pressure is released, the pistons are forcibly retracted by piston seals having retractor function as well as sealing function.

When the pressure is released, if only the pistons retract with the pads kept in frictional contact with the disk, the pads will apply dragging force to the disk, causing brake squeaks, uneven wear of the pads and the disk or judder resulting from change in the thickness of the disk. Dragging also incurs waste of energy and abnormal wear of the pads. Conventional disk brakes have therefore means for forcibly retracting the pads together with the pistons when the brake pressure is released, to reliably separate the pads from the disk.

FIG. 9 shows one such means which is disclosed in Japanese patent publication 9-53668 filed by the applicant of this invention. In this arrangement, a thin plate or shim 111 is disposed between the friction pad and the pistons on each side. The friction pads 106 hang from pad pins extending across the window of the caliper. Each shim 111 has first claws 114 resiliently gripping the back plate 106a of each pad 106 by engaging its inner side, and third claws 112 resiliently engaged in grooves formed in the pistons near their openings. In order to prevent the shims 111 and back plates 106a from moving radially outwardly of the disk, each shim 111 is secured to the back plate 106a by clips 116 mounted on the pad pins.

FIG. 10 shows a different conventional arrangement in which the clips 116 are not used. In this arrangement, each shim 111 has second claws 113 resiliently gripping the portions of the back plates 106a extending beyond the torque bearing portions of the friction pad 106 so that the friction pad 106 can slide radially of the disk.

In order that the pads can retract together with the pistons, no unnecessary play is permissible in the axial direction of the pistons, while the pads have to be mounted so that they can be slid out through the window when the pad pins are removed. To meet both these requirements, clips 116 are used in the first-mentioned prior art. But this arrangement is economically undesirable because the clips add to the number of brake parts. In the latter conventional arrangement, in which the second claws 113 grip the portions of the back plates 106a extending beyond the torque bearing portions of the friction pad 106, the claws 113 will collide against the torque bearing portions of the caliper every time the brake is applied. The claws will thus be quickly worn and/or deformed to such an extent as to lose their function of holding the back plates 106a.

The shims disposed between the friction pads and the pistons also help suppress disk brake squeaks. To suppress brake squeaks, it is important not to conduct the movement of the pads during braking directly to the pistons. But in the above prior art, the first and second claws and the clips join the shims directly to the pads in such a manner that the pads and shims can scarcely move in a direction parallel to the sliding surfaces of the pads relative to each other. In such an arrangement, the shims can scarcely suppress brake squeaks.

SUMMARY OF THE INVENTION

The disk brake according to the present invention has first and second shims. Each first shim has first claws gripping the friction pad to eliminate any unnecessary play in the axial direction of the pistons, and second claws coupling the first and second shims together and mounted so as not to interfere with the torque bearing portions. Each second shim has third claws engaging the pistons. The shims and their claws are arranged such that the friction pads and the pistons can move relative to each other in the direction parallel to the sliding surfaces of the pads.

With this arrangement, it is possible to eliminate any unnecessary play in the axial direction of the piston and thus to retract the friction pads together with the pads. The second claws have an outer width greater than the torque bearing width of the friction pads, so that the second claws will never collide against the torque bearing portions of the caliper when the brake is applied. Thus, they maintain their function of resiliently holding the first or second shim.

In order to minimize conduction of micro-vibrations of the pads during braking to the pistons, the first shims are preferably made of a thin rolled steel plate with a resilient material coated on one or both sides thereof.

Each second shim has a single or a plurality of second claws corresponding to the number of pistons on each side. If each second shim has a single second claw, the single claw is preferably formed by cutting the second shim and raising the thus cut portion. If each second shim has a plurality of second claws, they are preferably separate members fixed to the shim by e.g. caulking or welding.

Other features and objects of the present invention will become apparent from the following description made with reference to the accompanying drawings, in which:

DETAILED DESCRIPTION OF THE PREFERRED EMBODIMENT

In order to retract the friction pads together with the retracting pistons, first and second shims are disposed between the respective friction pads and pistons. Each first shim, provided near the pad, has first claws gripping the back plate of the pad. Each second shim, provided near the piston, has third claws resiliently engaged in the grooves formed in the piston near its opening. One of the first and second shims on each side has second claws resiliently gripping the other shim so that the first and second shims can slide relative to each other in the radial direction of the disk.

Embodiments of this invention are now described with reference to the attached figures.

Figure 1:
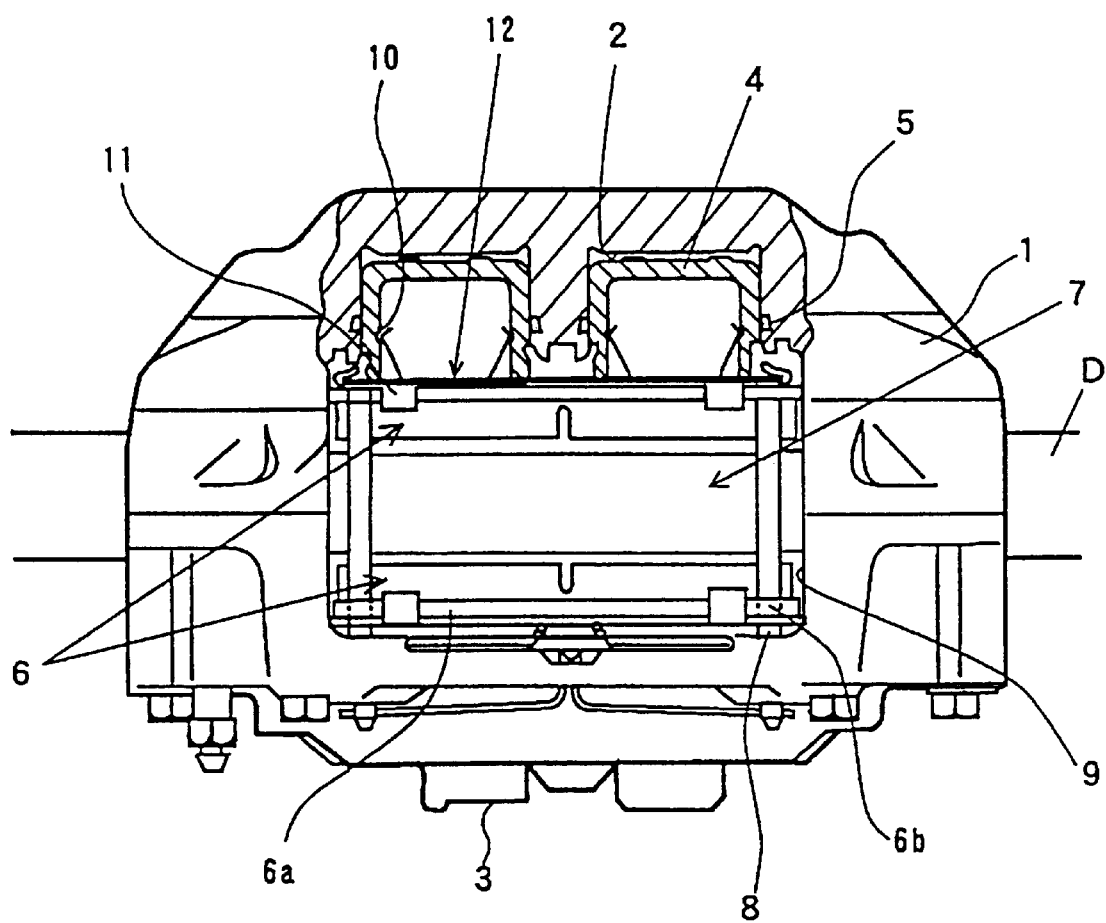
FIG. 1 is a plan view of the entire disk brake according to the present invention.

FIG. 1 shows an open-topped disk brake with opposite pistons. The disk brake includes a caliper 1 having fluid pressure cylinders 2 communicating with a fluid pressure inlet 3, and pistons 4 slidably mounted in the respective cylinders 2 and having their outer periphery liquid-tightly sealed by piston seals 5 which serve as piston retractors.

Friction pads 6 are provided opposite to each other on both sides of the disk D. Pad pins 8 are mounted so as to extend across a window 7 of the caliper 1 and loosely through the pin holes 6b formed in back plates 6a for the pads 6 to axially slidably support the pads 6. To brake a wheel or any rotating object to which the disk D is fixed, fluid pressure is applied to the pistons 4 to move the pistons toward the pads 6 and thus to press the pads into frictional contact with the disk D. During braking, the braking torque applied to the pads 6 is borne by a torque bearing portion 9 of the caliper 1.

Figure 2:
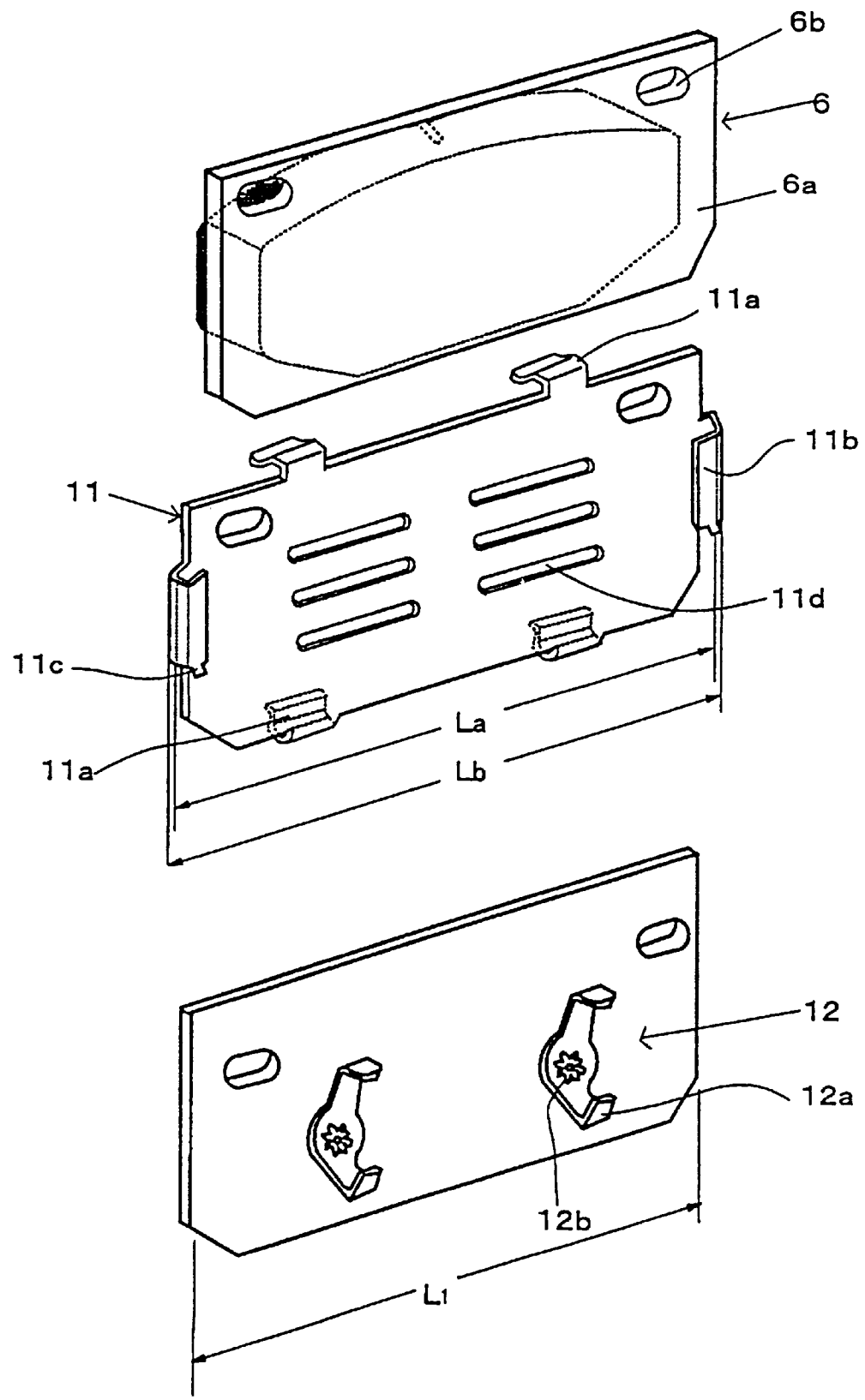
FIG. 2 is a perspective view of a first embodiment of the present invention.
Figure 3:
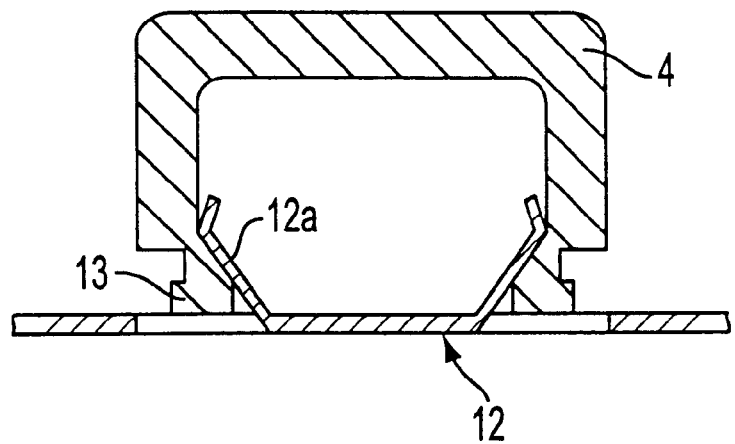
FIG. 3 is a sectional view of a piston and a first shim engaged in the piston.

FIG. 2 shows first and second shims of the first embodiment of the present invention. The first shim 11 has first claws 11a resiliently embracing the back plate 6a of each pad 6 by straddling it at its outer and inner edges with respect to the radial direction of the disk. The second shim 12 has third claws 12a resiliently fit in the open ends of the pistons 4 as shown in FIG. 1. To keep the claws 12a engaged in the pistons 4, each piston may be formed with machined grooves 10 as shown in FIG. 1, or with a constricted portion 13 along its open end as shown in FIG. 3. The latter arrangement is economically advantageous because it can be formed by plastic deformation.

Each first shim 11 has second claws 11b resiliently gripping the second shim 12 so that the shim 11 can slide radially of the disk. Thus, when the fluid pressure is released and the pistons 4 retract, the friction pads 6 move together with the pistons 4. When the pads 6 are worn, they can be easily pulled out through the window 7 together with the first shims 11 for replacement by removing the pad pins 8 guided by the second claws 11b of the first shims 11. The worn pads 6 thus pulled out together with the first shims 11 are detached from the shims 11. New pads 6 are then attached to the first shims 11 and the assembly is attached to the second shims 12 already coupled to the piston 4. Preferably, each claw 11b is provided with a guide lug 11c to serve as a guide when the first shim 11 is attached to the second shim 12.

Preferably, the first shims 11 are coated with a resilient material on one or both sides thereof to minimize conduction of micro-vibrations from the pads 6 to the pistons 4 during braking.

Further, in order to minimize conduction of the movement of friction pads 6 to the pistons 4 during braking, the first shims 11 are preferably formed with grease sumps 11d for keeping lubricating oil or grease.

The second claws 11b of the first shims 11 are formed by bending. The inner width La of the claws 11b of each shim 11 should be sufficiently larger than the width L1 of the second shims 12 in a tangential direction to give freedom of movement of the shim 12 in a direction parallel to the sliding surface of the pad 6.

The second claws 11b of the first shims 11 are bent into U shape. The outer width Lb of the claws 11b of each shim 11 is preferably smaller than the width of the back plates 6a in a tangential direction so that the shims 11 will not collide against the torque bearing portions 9 during braking.

Figure 4:
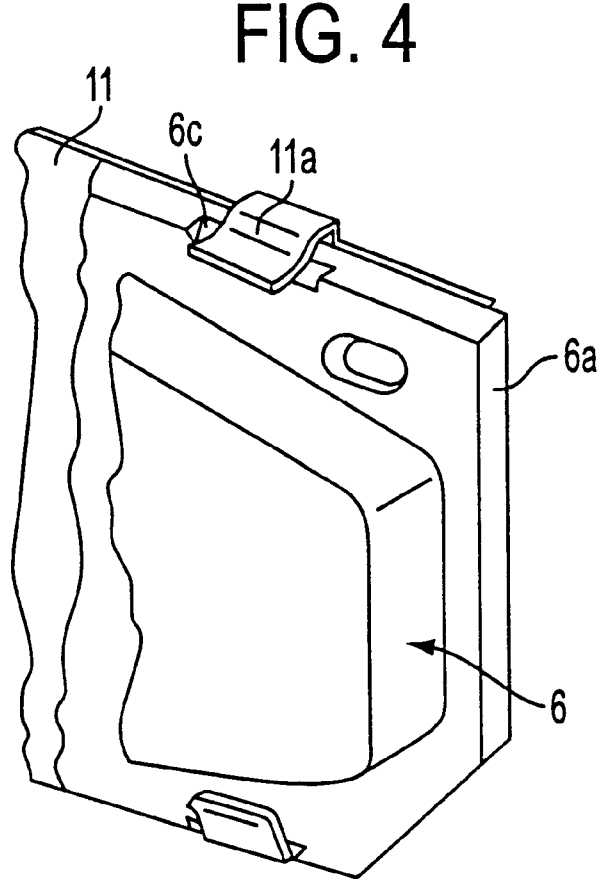
FIG. 4 is a partial perspective view of a friction pad and a first shim.

For more reliable engagement between the back plate 6a of each pad 6 and the first claws 11a of the first shim 11, chamfers 6c having a width of 1–1.5 mm may be formed on the back plates 6a as shown in FIG. 4.

Figure 5:
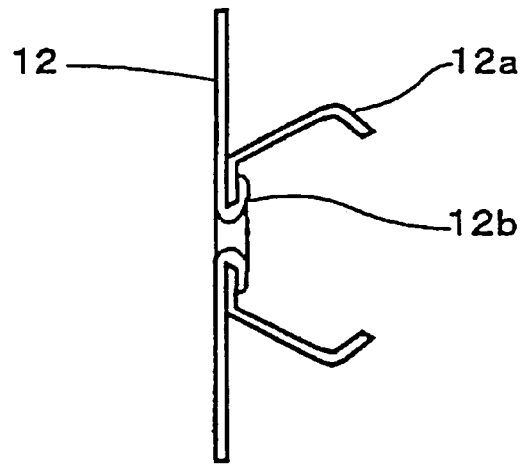
FIG. 5 is partial sectional view of a second shim and a separate third claw secured to the second shim by caulking.

The third claws 12a of the second shims 12 may be formed by cutting the shims 12 and raising the thus cut portions as shown in FIG. 3, or may be secured to the shims 12 by caulking at 12b as shown in FIG. 5. If the brake has a single piston on each side, the third claws 12a may be positioned so as to fix the shims 12 in either the radial or rotating direction of the disk. For the two-piston arrangement, the third claws 12a should be positioned so as to fix the shims 12 in the radial direction of the disk as shown in FIG. 2. This is because, if the shims 12 are bound in the rotating direction of the disk, the third claws 12a might not function properly due to accumulated errors in the pitch between the pistons and the pitch between the third claws 12a of the second shims 12.

Figure 6:
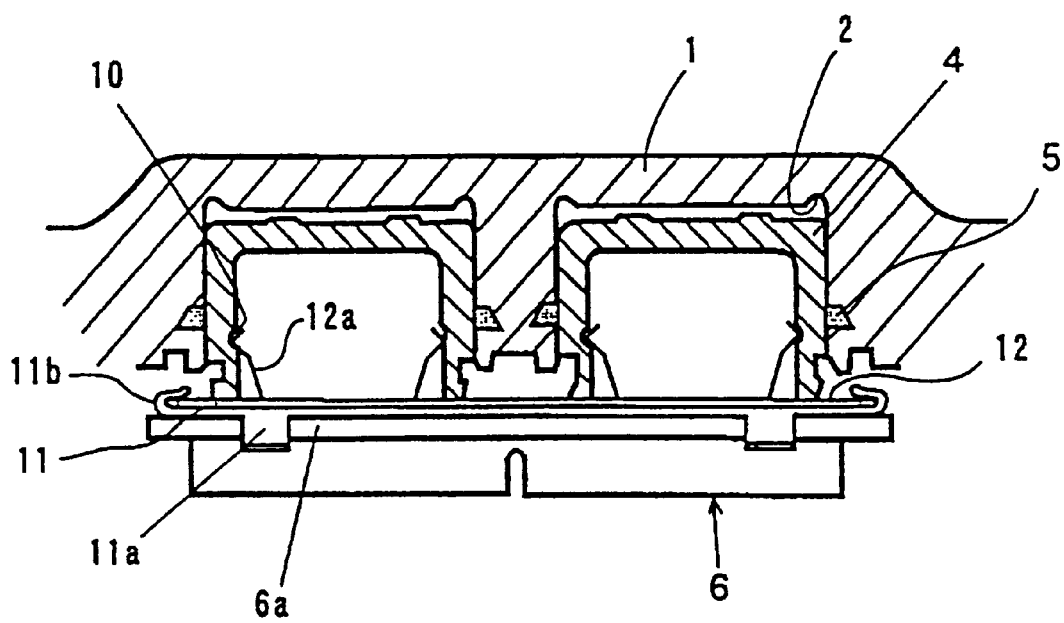
FIG. 6 is a enlarged section of pistons and a friction pad of the first embodiment.

For better understanding of the first embodiment of the present invention, the pistons 4 and the friction pad 6 are shown in enlarged scale in FIG. 6.

Figure 7:
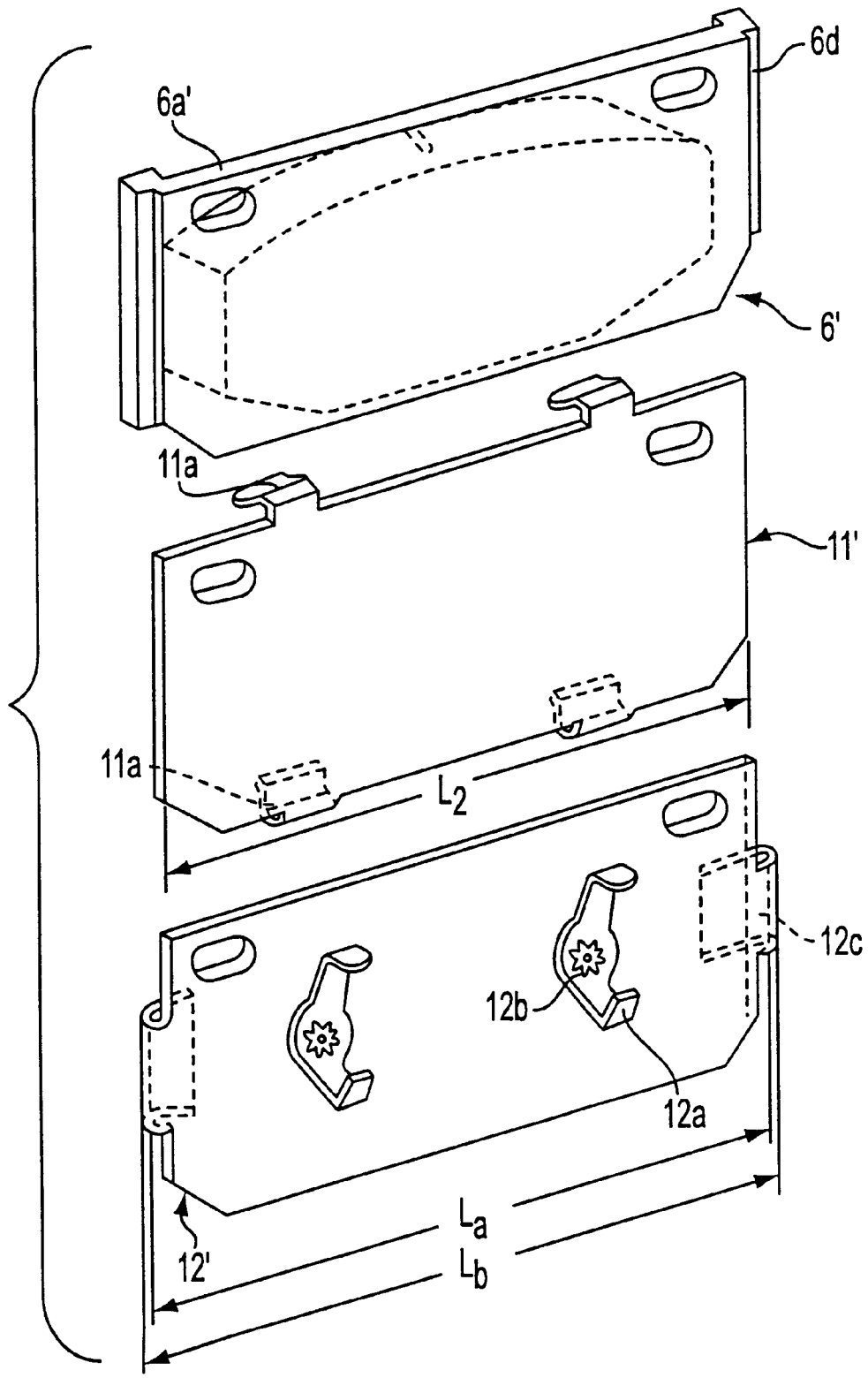
FIG. 7 is a perspective view of a second embodiment of the present invention.

FIG. 7 shows the second embodiment of the present invention. If it is difficult to provide the coated first shims with the second claws by plastic deformation, the second claws may be formed on the second shims. The first claws 11a of the first shims 11' and the third claws 12a of the second shims 12' are the same as the first and third claws of the first embodiment.

The difference lies in that the second claws 12c are formed on the second shims 12', not on the first shim 11'. For this purpose, it is necessary to provide shoulders 6d on both sides of the back plates 6a' at the torque bearing portions, and to provide spaces to receive the second claws 12c of the second shims 12'. Instead of the shoulders 6d, chamfers may be formed.

The second embodiment functions in exactly the same way as the first embodiment.

Figure 8:
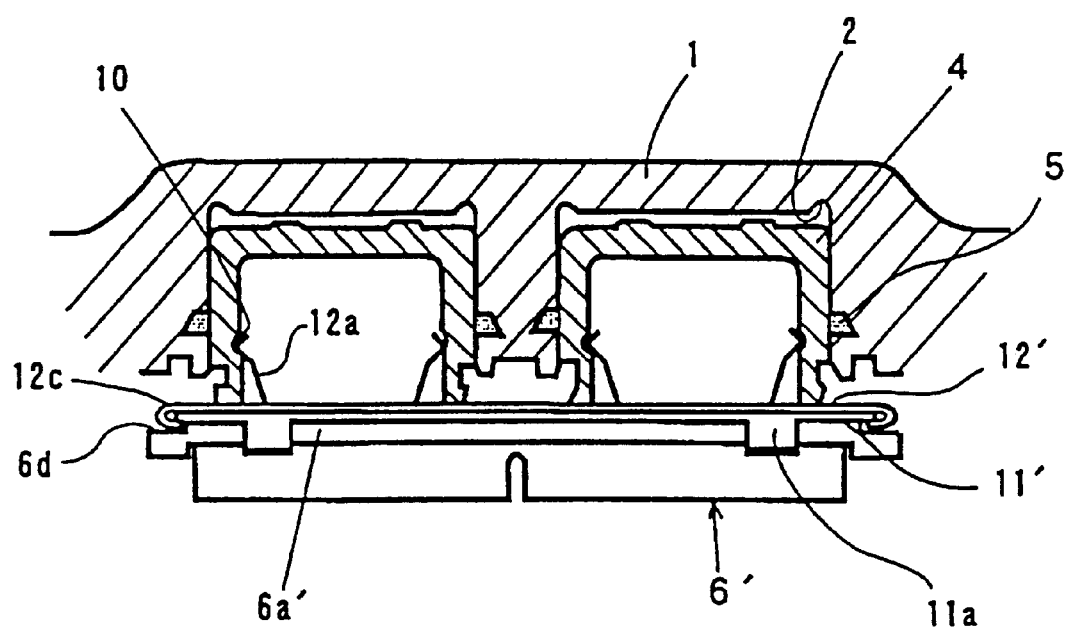
FIG. 8 is an enlarged section of pistons and a friction pad of the second embodiment.
Figure 9:
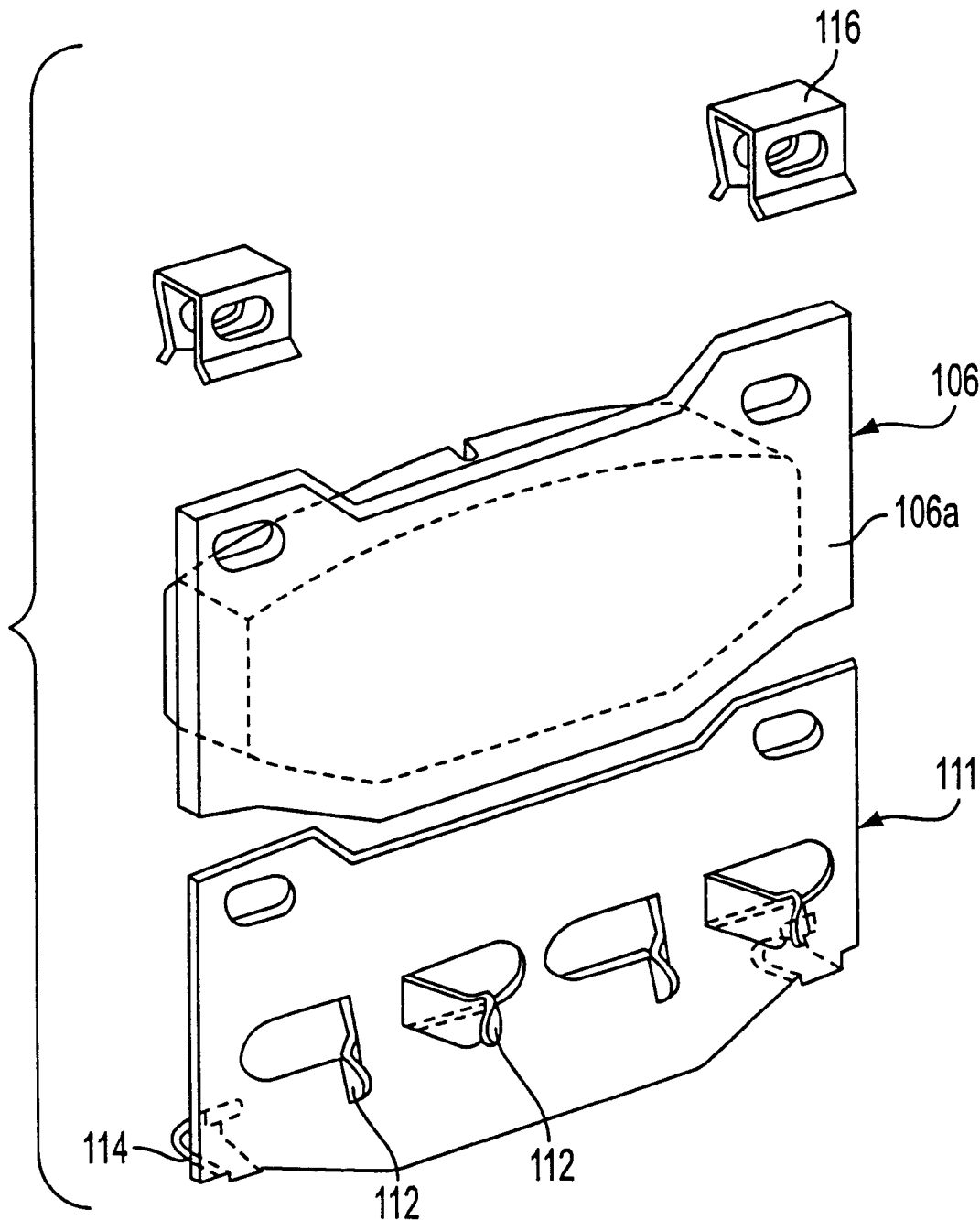
FIG. 9 is a perspective view of a conventional arrangement.
Figure 10:
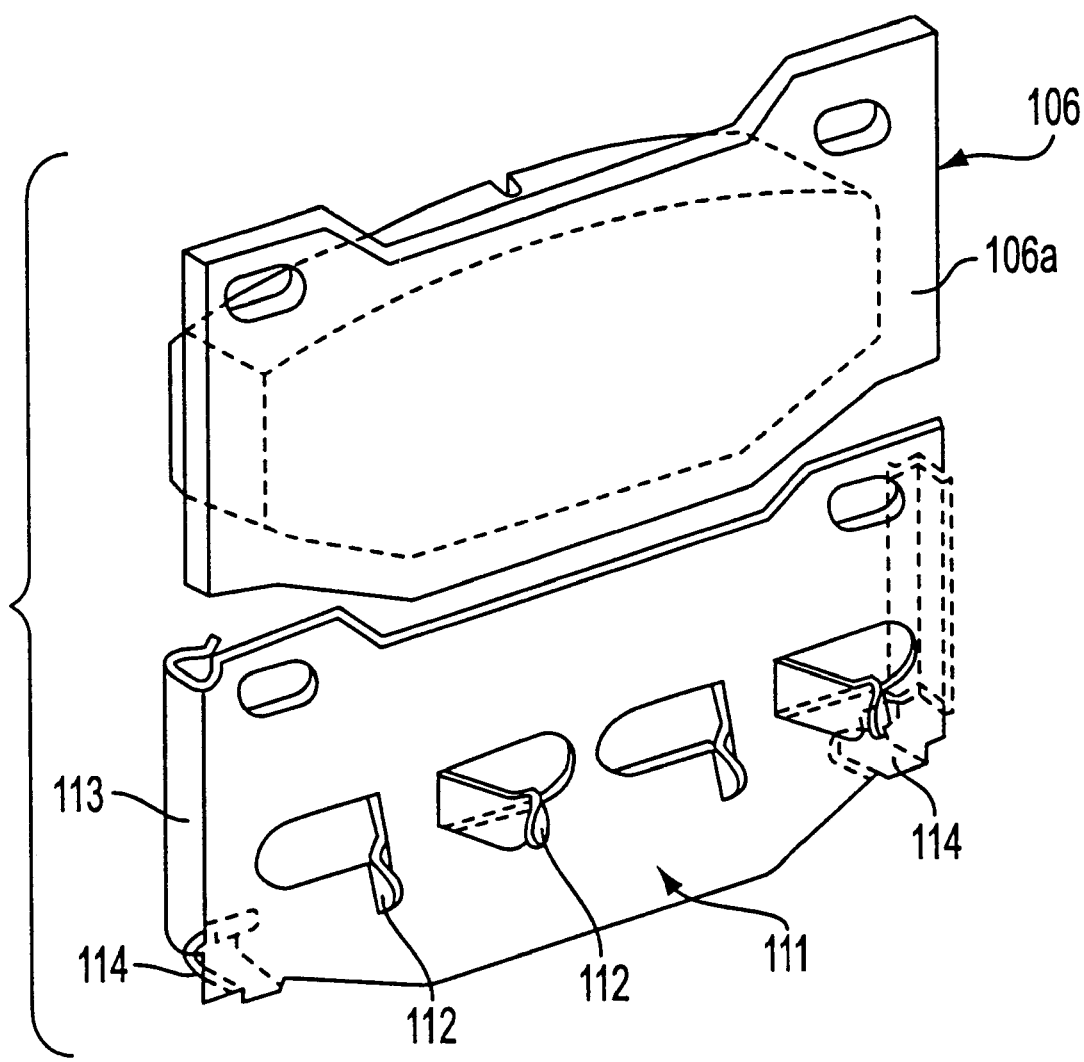
FIG. 10 is a perspective view of another conventional arrangement.

For better understanding of the second embodiment of the present invention, the pistons 4 and the friction pad 6' are shown in enlarged scale in FIG. 8.

According to the present invention, two shims are disposed between the friction pad and the pistons on each side of the disk. The shim near the friction pad grips the pad. The shim near the piston engages the inner surface of the pistons. The friction pads can thus be retracted together with the pistons when the latter retract. This minimizes uneven wear of the pads and the disk, and prevents waste of energy. The shims also minimize conduction of micro-vibrations of the friction pads during braking to the pistons in the axial and radial directions, thereby suppressing brake squeaks.

Worn pads can be replaced easily by removing the pad pins and pulling out the pads together with the first shims. This is possible because the first shims are slidable relative to the second shims.

What is claimed is:

1. An open-topped disk brake comprising a disk, friction pads provided on opposite sides of said disk and having back plates, a caliper having a window and fluid pressure cylinders, pad pins extending across said window for supporting said friction pads, pistons slidably received in said fluid pressure cylinders for urging said friction pads against said disk, retractor means for retracting said pistons when fluid pressure is released, first and second shims disposed between said friction pads, said first shims being provided near said friction pads, first claws provided on said first shims and resiliently embracing said back plates of said pads by straddling outer and inner edges of said back plates with respect to the radial direction of the disk, said second shims being provided near said pistons, third claws provided on said second shims and detachably and resiliently engaging said pistons, second claws provided on one of said first shims and said second shims for resiliently gripping the other of said first shims and said second shims so that said first and second shims are moved together.

2. A disk brake as claimed in claim 1 wherein the outer width of said second claws is slightly smaller than the width of said back plates in a tangential direction of said friction pads.

3. A disk brake as claimed in claim 1 wherein said first shims are rolled steel plates with a coating of resilient material provided on one or both sides thereof.

4. A disk brake as claimed in claim 1 wherein said third claws are formed by cutting said second shims and raising the thus cut portions.

5. A disk brake as claimed in claim 1 wherein said third claws are separate members caulked, welded or otherwise fixed to said second shims.

* * * * *

UNITED STATES PATENT AND TRADEMARK OFFICE
CERTIFICATE OF CORRECTION

PATENT NO. : 6,116,384
DATED : September 12, 2000
INVENTOR(S) : A. Matsumoto et al.

It is certified that error appears in the above-identified patent and that said Letters Patent is hereby corrected as shown below:

Title page,
Item [30], Foreign Application Priority Data, the following priority document was omitted and should be included:

-- Dec. 27, 1996  [JP]  Japan 8-349982 --

Item [56], References Cited,
FOREIGN PATENT DOCUMENTS, the following references were omitted and should be included:

-- 0-747608   12/1996   EPO
   0-138081   4/1985    EPO
   4-020077   1/1992    Germany --

OTHER PUBLICATIONS, the following reference was omitted and should be included:

-- An English Language Abstract of JP 9-53668 --

Signed and Sealed this

Twentieth Day of November, 2001

Attest:

NICHOLAS P. GODICI
*Attesting Officer*    *Acting Director of the United States Patent and Trademark Office*